(12) United States Patent
Sluyski

(10) Patent No.: US 11,728,893 B1
(45) Date of Patent: Aug. 15, 2023

(54) METHOD, SYSTEM, AND APPARATUS FOR PACKET TRANSMISSION

(71) Applicant: Acacia Communications, Inc., Maynard, MA (US)

(72) Inventor: Michael Sluyski, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 182 days.

(21) Appl. No.: 17/161,200

(22) Filed: Jan. 28, 2021

Related U.S. Application Data

(60) Provisional application No. 62/966,611, filed on Jan. 28, 2020.

(51) Int. Cl.
| H04B 10/40 | (2013.01) |
| H04L 69/22 | (2022.01) |
| H04L 47/20 | (2022.01) |
| H04L 47/6275 | (2022.01) |
| H04L 47/6295 | (2022.01) |
| H04L 47/32 | (2022.01) |

(52) U.S. Cl.
CPC .............. *H04B 10/40* (2013.01); *H04L 47/20* (2013.01); *H04L 47/32* (2013.01); *H04L 47/6275* (2013.01); *H04L 47/6295* (2013.01); *H04L 69/22* (2013.01)

(58) Field of Classification Search
None
See application file for complete search history.

(56) References Cited

U.S. PATENT DOCUMENTS

| 5,838,681 | A * | 11/1998 | Bonomi ............... H04L 49/25 370/477 |
| 6,417,944 | B1 * | 7/2002 | Lahat ................ H04Q 11/0005 398/79 |
| 9,390,056 | B1 * | 7/2016 | Noureddine ........... H04L 45/16 |
| 10,432,536 | B1 * | 10/2019 | Subramanian ........ H04L 47/805 |
| 2002/0118692 | A1 * | 8/2002 | Oberman ............ H04L 49/3081 370/389 |
| 2002/0141427 | A1 * | 10/2002 | McAlpine ............. H04L 49/50 370/413 |
| 2003/0086140 | A1 * | 5/2003 | Thomas ............. H04Q 11/0067 348/E7.07 |
| 2004/0156390 | A1 * | 8/2004 | Prasad ................. H04J 3/1617 370/466 |
| 2004/0172658 | A1 * | 9/2004 | Rakib .................... H04L 12/66 725/111 |
| 2006/0136570 | A1 * | 6/2006 | Pandya .............. G06F 9/30036 709/217 |
| 2011/0219287 | A1 * | 9/2011 | Srinivas ................ G06F 11/10 714/752 |
| 2019/0147202 | A1 * | 5/2019 | Harney ............... H04B 5/0062 235/375 |

FOREIGN PATENT DOCUMENTS

JP 2004531001 * 10/2004 ........... G06F 13/385

* cited by examiner

*Primary Examiner* — Darren E Wolf
(74) *Attorney, Agent, or Firm* — K&L Gates LLP

(57) ABSTRACT

A method, system, and apparatus for parsing incoming frames; classifying the frames by information contained in a header of the ethernet frame; and performing an action on the classification.

20 Claims, 6 Drawing Sheets

METHOD, SYSTEM, AND APPARATUS FOR PACKET TRANSMISSION

CROSS REFERENCE TO RELATED APPLICATION

This application claims the benefit of U.S. Provisional Patent Application Ser. No. 62/966,611 filed Jan. 28, 2020 entitled "Method, System, and Apparatus for Packet Transmission," which is hereby incorporated herein by reference in its entirety for all purposes.

BACKGROUND

Contemporary optical communications and other photonic systems make extensive use of photonic integrated circuits that are advantageously mass-produced in various configurations for various purposes.

SUMMARY

A method, system, and apparatus for parsing incoming frames; classifying the frames by information contained in a header of the ethernet frame; and performing an action on the classification.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
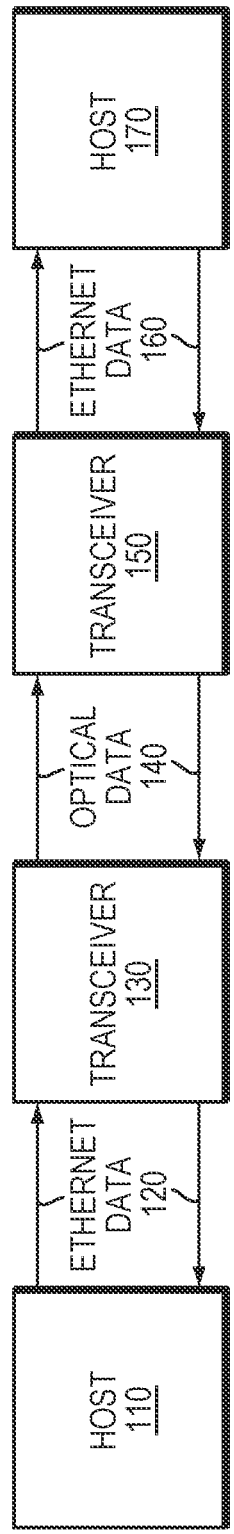
FIG. 1 illustrates a simplified system with host (server) and unmanaged transceivers, in accordance with an embodiment of the disclosure.

In many embodiments, Applicant has realized that it may be important to improve network bandwidth utilization and drive the cost of transmitted bits down. In certain embodiments, the current disclosure may enable improving efficiency of transmitted bandwidth, by making a host interface more packet aware. In most embodiments, Applicant has realized that optical transceivers tend to be used as dumb pipes or links in a network fabric that has switches and routers. In many embodiments, Applicant has realized that routing capability usually resides in switches and routers and optical transceivers simply transmit data to another optical transceiver. In almost all embodiments, Applicant has realized that there may be a benefit to enable a transceiver to have insight into the data it transmits, perform actions on or based on the data, and to enable the transceiver to communicate with routers and switches. In some embodiments, packets may be referred to herein as ethernet frames and ethernet frames may be referred to as packets. In most embodiments, a packet may be segmented where an ethernet frame may not be segmented.

In some embodiments, the current disclosure may improve efficiency of a switch/router interface (client or host-side interface(s) of optical Transceivers/Muxsceivers). Typically, today's Coherent Optical Transceivers/Muxsceivers deliver bits (e.g., they are a L0/L1 device). In almost all embodiments, a Transceiver/Muxsceiver may not be aware of a packet and may function as a "dumb pipe." In many embodiments, the current disclosure may enable a transceiver that is more packet-aware (i.e., has L2/L3 visibility). In certain embodiments, the current disclosure may enable a Transceiver/Muxsceiver to handshake with a switch/router, using standard IEEE 802.1/802.3 mechanisms to prioritize and deliver the most valuable packets over the link. In most embodiments herein, a transceiver may refer to an optical coherent transceiver. In almost all embodiments, a coherent optical transceiver may be enabled to receive electrical data, convert it to optical data, and transmit the optical data. In most embodiments, a coherent optical transceiver may be able to receive optical data and transform the optical data into electrical data. In certain embodiments herein, a transceiver may be an optical transceiver or a coherent optical transceiver. In some embodiments, a coherent optical transceiver may also be a muxsceiver.

Generally, an optical transceiver is considered a L0/L1 level device in the 7-level Open Systems Interconnection (OSI) model. Layer 0/1 is the Physical Link Layer (where L0 could be a logical port of the physical interface). Typically, layer 2 is the Data Link Layer. Conventionally, Layer 3 is the Network Layer, Layer 4 is the Transport Layer, Layer 5 is the Session Layer, Layer 6 is the Presentation Layer, and Layer 7 is the Application Layer.

Conventionally, Transceivers/Muxsceivers map multiplexed bits to/from a line interface in a lossless fashion (L0/L1 devices). Typically, a host interface bandwidth is relatively coarse when compared to new innovations at the coherent interface that can optimize bandwidth vs. reach. Usually, standards based host interfaces are 100 Gbit, 200 Gbit, 400 Gbit and possibly 800 Gbit or 1 Tbit in the future. In many embodiments, Applicants have realized that coherent optical transmission may be more granular (e.g., 50 G granularity) and customized using modulation techniques. Typically, a transceiver has needed to have a symmetrical bandwidth between ethernet clients and an optical line or optical throughput. In some embodiments, Applicants have realized that this may result in a mismatch in transfer bandwidth (BW) which may not be well addressed using conventional techniques and may leave BW stranded or unavailable.

In some embodiments, making a host interface more packet aware may improve the efficiency of a bandwidth transfer function. In certain embodiments, a host interface may be Ethernet and may carry packets (L2/L3). In other embodiments, when packets are not being transmitted, a link may be padded with idles. In some embodiments, packet traffic may be bursty in nature and contain a mix of high-priority and low-priority packets from a small to a large set of originators. In almost all embodiments, Applicant has realized that if traffic padded with idles could be discarded by a transceiver, then other high priority data may be sent.

Typically, Switches and Routers typically use a hash-based function (e.g. LAG or ECMP group) in conjunction with virtual output port shaping to load balance traffic into transceiver/muxsceiver interface ports. Conventionally, however, transceivers/muxsceivers do not balance traffic and are unaware of traffic that passes through them. In most embodiments, Applicant has realized that conventional algorithms tend to operate, at best, at an 80-85% efficiency. In some embodiments, depending on an interface port BW, the number of interface ports, and the packet diversity (n-tuple differentiation) efficiency of load balancing algorithms may be considerably lower.

In almost all embodiments, Applicant has realized that moving traffic shaping to a physical port (i.e. into a transceiver) may enable increasing of efficiency of the packet transfer significantly (inverse of the Switch/Router load balancing inefficiency). In further embodiments, if a Transceiver/Muxsceiver is L2/L3 packet aware the transceiver may prioritize more valuable packets ahead of less valuable packets. In some embodiments, using one or more of the techniques discussed herein, dynamic metric of measure may be a cost per valuable bit transferred vs. cost per bit transferred.

In many embodiments, datacenter networks may have significant overhead and non-valuable data being transported. In certain embodiments, by making a Transceiver packet-aware (L2, L3), a transceiver/muxsceiver may be directly capable of determining and transferring the most valuable traffic. In some embodiments, a transceiver/muxsceiver may offload a switch/router by managing output queue(s) directly. In certain embodiments, a transceiver may be considered a layer L0/L1 device. In other embodiments, a transceiver may have an ability to identify packets and pack data more efficiently to a line using L3/L4 information. In many embodiments, a transceiver may be able to classify and to flow-control traffic to prevent traffic loss. In some embodiments, flow control may be done as lossless or (optionally) lossy if an operator so chooses. In certain embodiments, cut-through forwarding and priority flow control (802.1Qbb) may be used to limit the need for deep packet buffering. In some embodiments deep packet buffers may be at a switch/router. In most embodiments herein, flow control may refer to controlling the flow of data. In many embodiments, lossless may refer to data transfer without the loss of data and lossy may refer to transfer of data where some of the data is lost, such as through dropping of packets.

In certain embodiments, where a coherent link is lower bandwidth than a host interface bandwidth (e.g., LH and ULH applications), L2/L3 visibility may be more efficient and more reliable than rate limiting at switch/router output queues. In most embodiments, there may be no chance of underflow/overflow of transceiver/muxsceiver buffers and no intimate knowledge of switch/router shaping capabilities is required.

In some embodiments, a client interface may overcome inefficiency of switch/router algorithms to load balance traffic over the host interface(s) by being L2/L3 packet aware and managing the output queue(s) directly. In certain embodiments, packet traffic by nature may be bursty. In many embodiments, being packet aware may allow traffic to be managed at a much finer granularity than L1 pipes into a client interface. In most embodiments, flow control may use 802.1x (VLAN priorities) or packet classification based on n-tuple inspection, and 802.3Qbb (Priority Pause) to back-pressure a switch/router when necessary. In certain embodiments, one or more of the techniques herein may avoid packet loss and places the deep packet buffering requirements back on a switch/router. In some embodiments, there may be no need for external buffering or deep packet buffers in a transceiver. In many embodiments, packets may also be processed in a cut-through manner to minimize buffering. In alternative embodiments, in the case of a severely congested condition a switch/router may enable a device to intelligently drop packets of low priority traffic. In certain embodiments, dropping packets may be an extension of a switch/router port, used at a vendor's discretion.

In many embodiments, the instant disclosure may enable a transceiver to use visibility into an L2 layer of the OSI stack to parse OH structures that make up the L0-L7 packet header. In most embodiments, given an ability to parse packets, a transceiver may classify packets and take an action based on the classifications. In some embodiments, priority of a packet may be either detected or associated to a packet by parsing and classifying the packets. In certain embodiments, packets may be parsed over a n-tuple (ordered set of the OSI stack header fields). Typically for Ethernet, the set would include {port, MAC address, VLAN1, VLAN2, ETHTYPE, SIP, DIP}. In certain embodiments, if packets include VLAN fields a priority tag may be read directly. In other embodiments, an n-tuple lookup may associate a priority based on a match.

In a particular embodiment, an example of an n-tuple classification may be the following:

({port+ETHTYPE=DIP=Transceiver Priority) or {VLAN_priority=transceiver priority}, or VLAN_priority assignments 1 . . . 2 can be transceiver priority).

In many embodiments, the current disclosure may enable delineation and parsing of Ethernet frames by a transceiver. In most embodiments, once an Ethernet frame has been parsed, the frame may be classified by a transceiver. In some embodiments, a transceiver may have a classification engine to perform the classification. In certain embodiments, classification may parse header fields and map them into a classification engine. In many embodiments, a classification engine may assign a packet priority. In certain embodiments, a CRC check may be done to validate a packet.

In most embodiments, the current disclosure may enable a transceiver that is able to talk to a host, router, and/or switch. Typically, a transceiver is unable to talk directly to a router beyond forwarding information sent to or from the transceiver or interacting through a control/management interface. Conventionally a control/management interface may be used for static configuration and in some cases gathering statistics. In most embodiments, Applicants have realized that a transceiver may add packets to information flow. In most embodiments, a switch, router, or host, may be able to parse packets and intercept additional ethernet packets added by a transceiver. In many embodiments, a transceiver would be a single component in a network fabric that may need to be modified to enable communication by adding additional ethernet packets to data flow as switches and routers usually have the ability to act on packets injected into ethernet data.

In certain embodiments, a transceiver may use standard mechanisms and algorithms that can be used to manage congestion. In some embodiments, 802.1Q VLAN may be used for tagging for priority assignment (by a host switch/router is common). In certain embodiments, 802.1Qbb (priority Flow Control) may be a packet protocol that can be used over a host interface to control or stop a rate of packets sent to a transceiver. In certain embodiments, a transceiver may insert Pause frames into a RX datapath. In many embodiments, a host may react to added packets in a timely fashion to stop packets bound for one of a transceiver's memory buffers (priority queues).

In many embodiments, a transceiver may set up a set of rules (e.g., look-up tables) in memory against to apply to packets matching n-tuple pattern known by a transceiver. In many embodiments, matching packets to a n-tuple patter may be done at speed in HW with a small amount of logic. In some embodiments, packet matching may be done on the fly (cut-through mode) to avoid requiring large packet buffers in the transceiver.

In some embodiments, a transceiver output queue may be monitored (e.g., FIFO full level). In certain embodiments, firmware of a transceiver may set thresholds which may backpressure transceiver logic to send PAUSE frames back to a Host switch/router. In some embodiments, if buffers filled packets may be dropped in a deterministic priority order. In certain embodiments, back-pressure mechanisms may be standard Ethernet packets that switch/routers observe.

In many embodiments, the current disclosure may enable a novel new architecture for a transceiver. In many embodiments, a transceiver may be enabled to transmit messages to hosts, switches, or routers using established ethernet protocols. In certain embodiments, a transceiver may be part of a switching or routing fabric and may do more than simply transmit bits from transceiver to transceiver. In almost all embodiments, a transceiver may have visibility into ethernet packets and or ethernet packet headers. In many embodiments, a transceiver may function as an offload engine to a host or switch or router. In most embodiments, a transceiver may retain a similar coherent front end to today's coherent optical receivers/transceivers with a client side digital processing block. In most embodiments, a transceiver may do framing, deskewing of frames, and look deeper into a frame to calculate its priority. In further embodiments, a transceiver may be able to take an action based on an ethernet priority.

In many embodiments, a transceiver may have logic embedded in hardware to perform packet inspection, classification, and actions. In certain embodiments, a transceiver may drop packets of a low priority when a transceiver is overburdened. In other embodiments, a transceiver may send a Pause ethernet command to a host/router/switch. In further embodiments, a transceiver may send a priority pause command to a host/router/switch.

In many embodiments, a transceiver may be able to capture overhead fields in an ethernet packet. In certain embodiments, a transceiver may be packet aware in that it has knowledge of packet overhead fields beyond frame alignment to capture certain overhead fields. In many embodiments, a transceiver may be able to look up information in a packet header to determine the priority of that packet. In some embodiments, a transceiver may have a classification engine, which may match an action based on a priority of that packet which applies rules to a packet based on a match-action classification engine (such as prioritize, drop, mirror, etc.). In many embodiments, mirroring an ethernet packet may mean replicating or shunting packets to another port (such as LLDP packets).

In some embodiments, a transceiver may be able to send a back pressure command to a host, router, or switch, to request lower bandwidth be sent to the transceiver. In further embodiments, the current disclosure may enable asymmetry between a host and a transceiver. In other embodiments, a transceiver may be able to change the value per bit transmitted by choosing to transmit bits with higher values. In further embodiments, certain switching functionality may be moved into a transceiver.

In many embodiments, a transceiver may have MAC functionality. In some embodiments, MAC may stand for media access controller. In further embodiments, a transceiver may have a MAC address. In most embodiments, a transceiver may be able to inject 802.11 Qbb ethernet packets into an ethernet stream. In many embodiments, a transceiver may be able to communicate to a host to enable the transceiver to comply with priority requirements of a service level contract. In further embodiments, by understanding priority, a transceiver may ensure that certain client data is transmitted at a higher priority than other client data.

In some embodiments, a transceiver may have a centrally buffered output queued. In some embodiments, a central buffer queue may hold packets or frames until a classifier and scheduler determines what to do with the packets/frames. In many embodiments, packets/frames may be queued to output or dropped once the packet/frame is classified. In most embodiments, using centralized memory or a central buffer queue may be a matter of convenience in design particularly if packets are re-ordered (e.g., due to priority). In some embodiments, packets or frames may be switched in the case there are multiple inputs/outputs.

In certain embodiments, a transceiver may be a multiport transceiver. In some embodiments, for a multi-port transceiver a port for which a packet entered may be used to classify the device. In many embodiments, it may be possible to give higher priority to different ports of a multi-port transceiver. In certain embodiments, port priority may be stored in an n—tuple.

In many embodiments, cut through or cut through mode may mean that a packet is processed on the fly (as opposed to store and forward). In many embodiments, Ethernet frames may be large (9600 bytes) and frame header information required to process a packet may be located in the first 64-128 bytes. In some embodiments, classification and packet processing may be done on a header of a packet while a packet is being stored to memory. In certain embodiments, in a case of large packets, transmission of the packet on an output may start prior to the packet being fully received on an input. In many embodiments, starting to transmit a packet before it is fully received may save on the amount of data needed to be buffered.

In some embodiments, a transceiver and a host may both have different ports. In certain embodiments, a Port may have queues with different priorities. Typically, 802.1 Qbb supports 8 priority queues per port and each priority queue can be PAUSED independently. In certain embodiments, it may be possible to set up a flow where priorities 1 and 2 are lossless and never gets paused, while priorities 3-4 may be back pressured at different rates, and packets from ports 5-8 may be dropped or passed using best effort with available remaining bandwidth. In certain embodiments, setting up data flow based on port priority may be referred to herein as port-based priority flow control. In other embodiments, setting up data flow control may be based on different priorities of different output queues. In further embodiments, a transceiver may support output queuing and multi-level scheduling.

In certain embodiments, output queuing may refer to prioritizing data in output queues. In many embodiments, each output port may have priority queues. In certain embodiments, output queues may be weighted and packets destined for these queues may be sent at different rates corresponding to a portion of the output bandwidth. In some embodiments, a sum of shaped queues usually may be 100% of available bandwidth. In many embodiments, RMON may mean remote monitoring. In certain embodiments, firmware of a transceiver may gather statistics and encapsulate the statistics into a packet. In certain embodiments, one or more packets containing statics may be injected into a data stream or sent over a host controller interface.

Refer now to the example embodiment to FIG. 1, which illustrates hosts communicating with a transceiver. In the example embodiment of FIG. 1, Host 110 has bi-direction ethernet data 120 with transceiver 130. In bi-directional ethernet data 120, there is no communication of data or messages between transceiver 130 and host 110 on the data plane beyond the ethernet data that is being sent through or received from transceiver 130. Transceiver 130 takes incoming ethernet data 120 and transforms it into optical data 140 that is sent to transceiver 150. Transceiver 130 also receives optical data 140 from transceiver 150. Transceiver 150 has bi-directional ethernet data 160 with host 170. Host 170 does not exchange messages or information between transceiver 150 and host 170 beyond the data that host 170 wants transceiver 150 to send to Host 110. In these embodiments, Transceivers 130 and 150 do not have the ability to send messages or feedback to host 110 or host 170.

Figure 2:
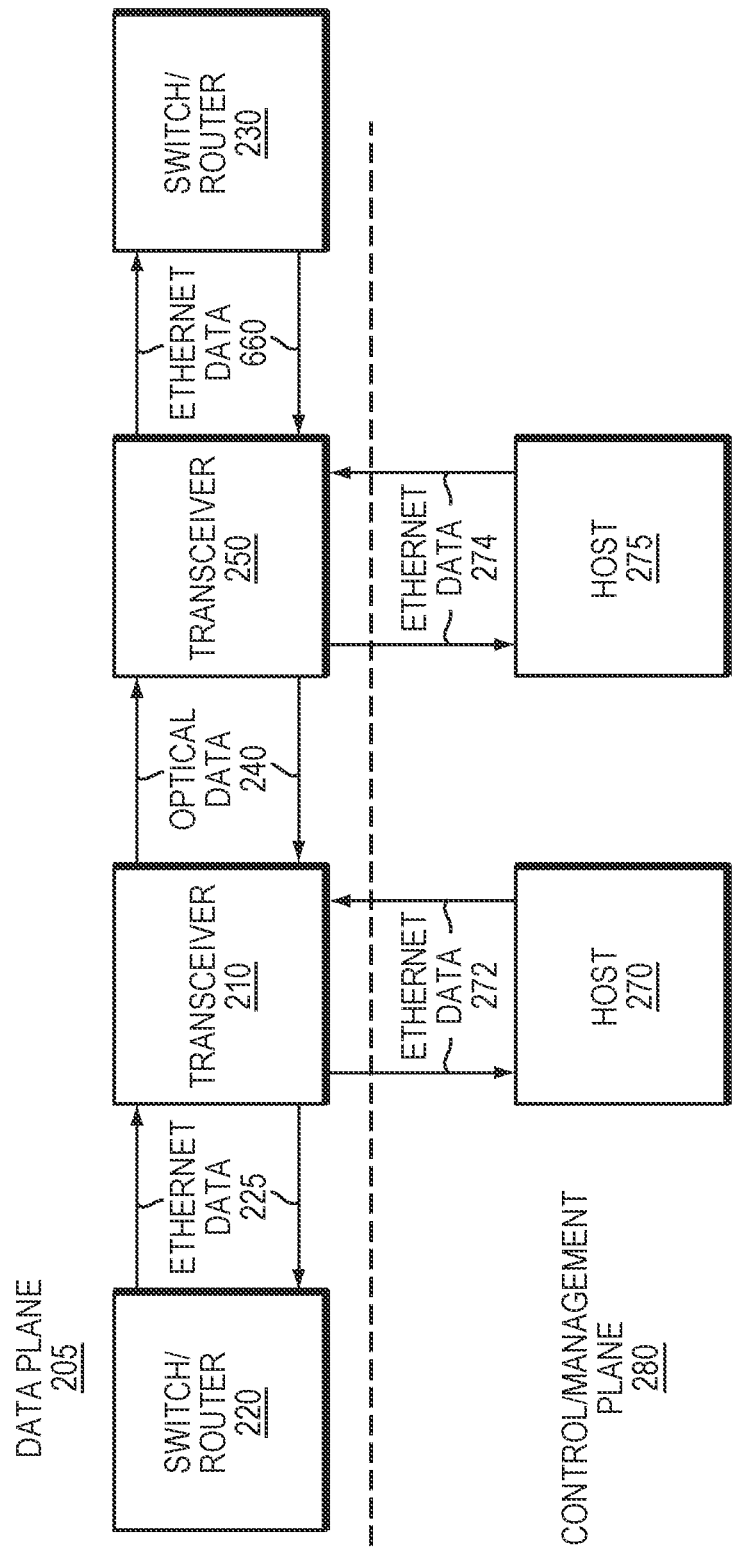
FIG. 2 illustrates a simplified system with switch/routers, and a managed transceiver, in accordance with an embodiment of the disclosure.

Refer now to the example embodiment of FIG. 2, which illustrates routers/switches and a transceiver. In FIG. 2, there are transceiver 210, switch/router 220, switch/router 230, transceiver 250, host 270 and host 275 on control plane 280. Transceiver 210 has bi-directional ethernet data 225 with switch/router 220. Transceiver 210 has bi-directional ethernet data 272 with host 270 for certain control plane commands. Transceiver 210 has bidirectional optical data 240 with Transceiver 250. In this embodiment Transceiver 210 has no way to send messages or communication to switch 220. Transceiver 210 has limited ability to send information to host 270 but has no ability to transfer any information from ethernet data 225 to host 270. Rather, transceiver 210 serves as a dumb pipe in that it receives and transmits ethernet data into ethernet data over optical data and ethernet over optical data into ethernet data. Transceiver 210 does not have a way to tell switch/router 220 that it is overloaded or cannot handle all the information being sent to it. Likewise, Transceiver 210 is not able to prioritize ethernet data nor is it able to drop or delay any ethernet data, even data of a low priority. Transceiver 250 has similar limitations as transceiver 210 in that it is not able to communicate with switch router 230 on the data plane or with host 275 outside of a control/management plane.

Figure 3:
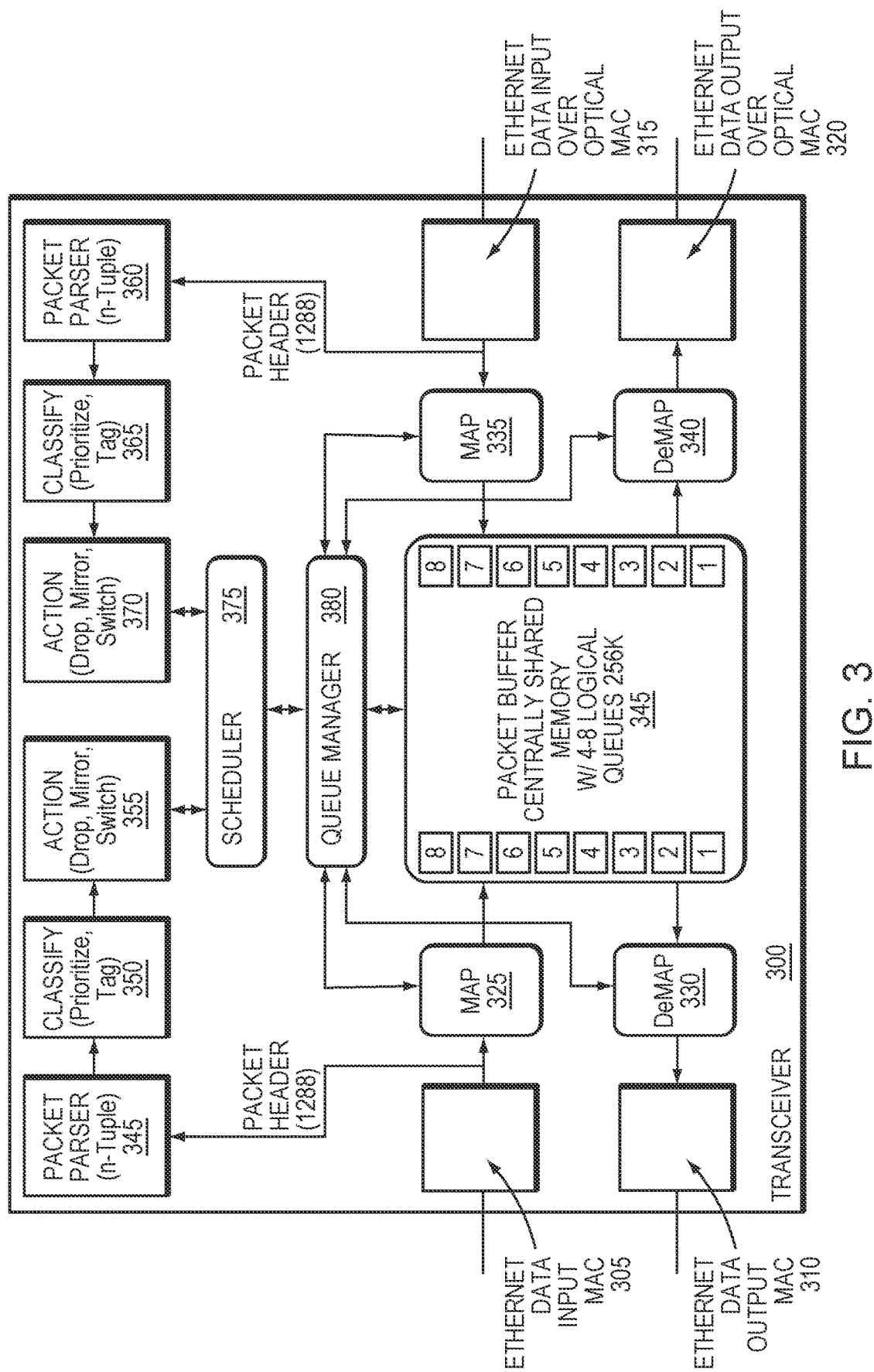
FIG. 3 illustrates a simplified architecture to enable a transceiver to have packet awareness, in accordance with an embodiment of the disclosure.

Refer now to the example embodiment of FIG. 3, which illustrates a sample architecture that enables a transceiver to be packet aware. Transceiver 300 has ethernet data input MAC 305 and ethernet data output MAC 310. Ethernet data input MAC 305 and ethernet data output 310 represent the input and output of electrical data being sent to and from transceiver 300. Transceiver 300 also has ethernet data input over optical MAC 315 and ethernet data output over optical MAC 320. Data input over optical MAC 315 and ethernet data output over optical MAC 320 represent how transceiver 300 sends and receives electrical data converted to or imposed on an optical signal. Ethernet data input MAC 305 feeds into map 325 which maps data into packet buffer 345. Demap 330 demaps data from packet buffer 345 to ethernet data output MAC 310. Map 335 maps data from Data input over optical MAC 315 to packet buffer 345. Demap 340 demaps data from packet buffer 345 to ethernet data output over optical MAC 320.

Packet header information from data received from Ethernet data input MAC 305 is sent to packet parser 345. Information from packet parser 345 is sent to classifier 350. Information from classifier 350 is sent to action block 355. Packet header information from data received from Ethernet data input over optical MAC 315 is sent to packet parser 360. Information from packet parser 360 is sent to classifier 365. Information from classifier 365 is sent to action block 370. Output from action blocks 355 and 370 is sent to scheduler 375. Scheduler 375 communicates with queue manager 380. Queue manager 380 manages packet buffer 345. Queue manager sends and receives messages to map 325, demap 330, map 335, and demap 340 as blocks pass through packet buffer 345.

Figure 4:
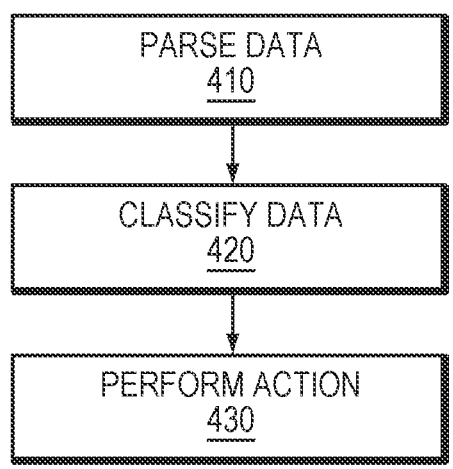
FIG. 4 illustrates a method for parsing, classifying, and acting on ethernet data, in accordance with an embodiment of the disclosure.
Figure 5:
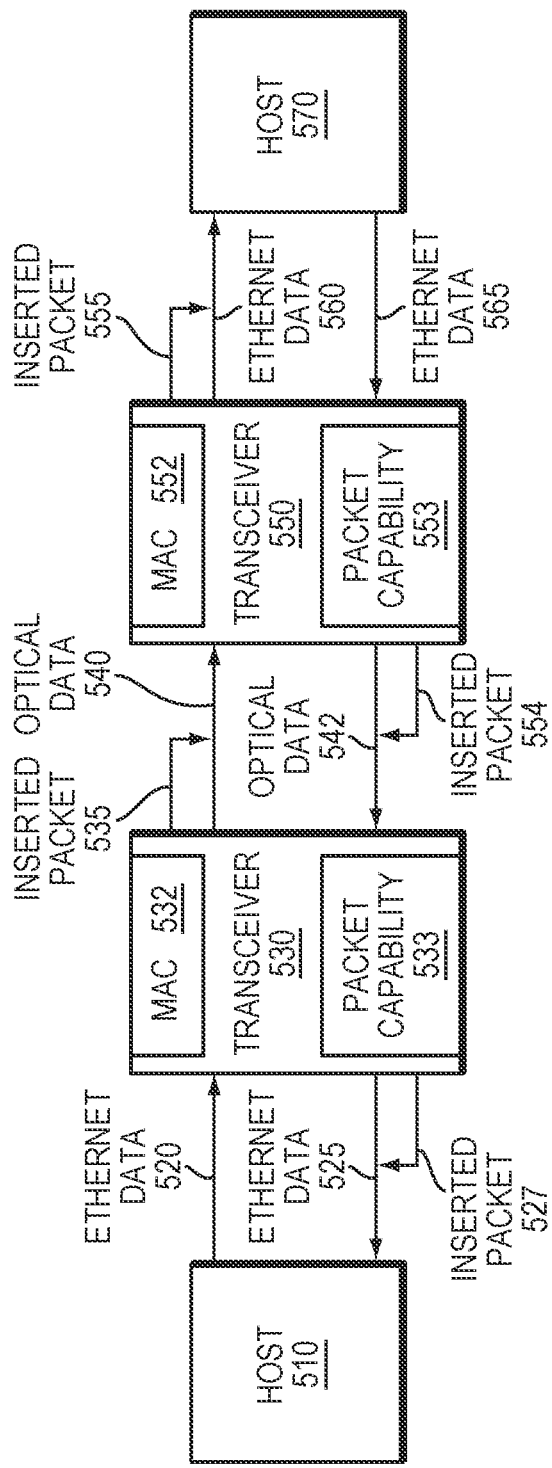
FIG. 5 illustrates a simplified system with a host (server), and transceivers that are packet aware, in accordance with an embodiment of the disclosure.

Refer now to the example embodiments of FIG. 4 and FIG. 5, which illustrates a system with hosts and transceivers, where the transceivers are able to communicate with the hosts. In the example embodiment of FIG. 5, Host 510 has bidirectional ethernet data with transceiver 530, ethernet data 520 and ethernet data 525. Transceiver 530 also has Packet capability 533 and MAC 532 to enable it to insert Ethernet packet 527 into ethernet data 525 to host 510. Adding ethernet packets into ethernet data 525 enables transceiver 530 to send commands and requests to host 510. In many embodiments, ethernet packets inserted into ethernet data between a host and transceiver may be any command that is supported by the ethernet protocol.

Referring back to the example embodiments of FIGS. 4 and 5, transceiver 530 also has packet capability 533, which may be similar to the parse, classify, and action logic described in the example embodiment of FIG. 4. Packet capability 533 enables transceiver 530 to parse packet data (step 410) from ethernet data 520. Packet capability 533 enables transceiver 530 to classify packet data that has been parsed (step 420), where such classification is often done based on a priority of the parsed packet. Packet capability also enables transceiver to perform actions (step 430) on ethernet data 520 from host 510.

In certain embodiments, an action may be to drop ethernet packets if they are of a low priority. In other embodiments, an action may be to send a host a pause command. In further embodiments, an action may be to send a host requests on what client data the host send or not sent to the transceiver. In further embodiments, a transceiver may send host bandwidth information to help the host enforce a service level agreement or otherwise prioritize traffic.

Referring back to the embodiments of FIGS. 4 and 5, transceiver 530 has bidirectional optical data, optical data 540 and 542, with transceiver 550. Transceiver 550 has MAC 552 and packet capability 553, similar to that of transceiver 530. Transceiver 550 has bidirectional ethernet traffic, ethernet data 560 and 565, with host 570. Transceiver 550 is also enabled to use MAC 552 to insert inserted packet 555 into ethernet data 560 sent to host 570. Packet capability 553 enables transceiver 550 to perform the same actions as transceiver 530 can with MAC 532.

FIG. 5 also illustrates that Transceiver 530 is also enabled to insert packets into optical data 540 to influence host 570 on the other side of transceiver 550. In a particular example with respect to FIG. 5, Transceiver 530 can insert inserted packet 535 pause command into optical data 540. Transceiver 550 converts inserted packet from optical data steam 540 into an ethernet data packet in ethernet data 560. Host 570 is enabled to remove inserted packet 535 from ethernet data 560.

Figure 6:
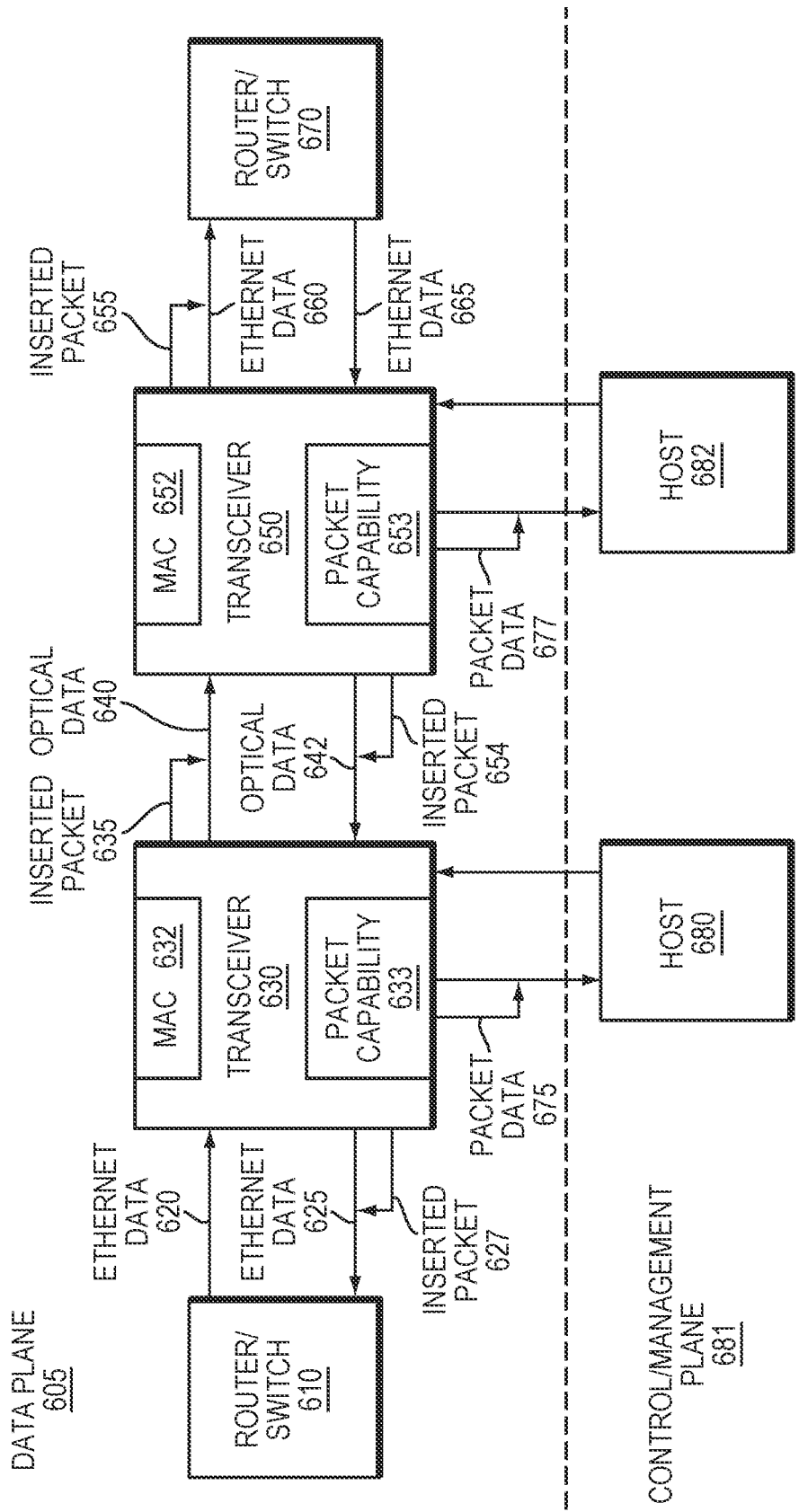
FIG. 6 illustrates a simplified system with switch/routers, and managed transceivers that are packet aware, in accordance with an embodiment of the disclosure.

Refer now to the example embodiment of FIG. 6, which illustrates a sample system of hosts, routers/switches, and transceivers. In FIG. 6, router/switch 610 has bidirectional ethernet data traffic, ethernet data 620 and 625, with transceiver 630. Transceiver 630 is enabled by MAC 632 to insert data such as inserted packet 627 into ethernet data 625 to router/switch 610. Transceiver 630 has packet capability 633, which may be similar to the parse, classify, action architecture in the example embodiment of FIG. 4, which enables transceiver 630 to parse packet or frame data, classify packets or frames based on header information of the frame or packet, and perform one or more actions based on the classification. Transceiver 630 also has bi-direction ethernet data with host 680, which is in control management plane 681. Transceiver 630 is able to insert data such as packet data 675 into an ethernet stream with host 680. Transceiver 630 is also able to redirect packet data from router/switch 610 to host 680 through packet capability 633 and MAC 632. Transceiver 630 is also enabled to insert data such as inserted packet 635 into optical data 640 sent to transceiver 650. Similarly, transceiver 650 is also enabled to insert data such as inserted packet 654 into optical data 642 from transceiver 650 to transceiver 630.

Transceiver 650 has bidirectional ethernet data, such as ethernet data 660 and ethernet data 665, with router/switch 670. Transceiver 650 is enabled to insert data such as inserted packet 655 into ethernet data 660 to router/switch 670. Transceiver 650 also has bidirectional ethernet data with host 682 and is enabled to insert data such as packet data 677 to host 682. As well using MAC 652 and packet capability 653 transceiver 650 can route packets from a router/switch to host 682.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor DSP. In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In certain embodiments, logic described herein may be fabricated on a custom ASIC chip. In other embodiments, one or more of the embodiments stored on a computer readable medium may be loaded into a processor and executed.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, or within ±2% of a target value in some embodiments. The terms "approximately" and "about" may include the target value.

The invention claimed is:

1. A packet aware (L2/L3) coherent optical transceiver comprising:
   an ethernet data input MAC that feeds into a map;
   a packet buffer, wherein the map maps data into the packet buffer; and
   a packet parser with access to packet buffer and with logic enabled to:
   parse incoming frames;
   read priority information in headers of the frames;
   classify the frames by information contained in headers of the frames; and
   perform an action on the classification.

2. The optical transceiver of claim 1 wherein a first action is to drop a frame classified with a low priority.

3. The optical transceiver of claim 2 wherein the optical transceiver further comprises logic to communicate over an ethernet protocol.

4. The optical transceiver of claim 3, wherein the optical transceiver has logic to insert a new ethernet packet into a data stream between the transceiver and a host.

5. The optical transceiver of claim 1 wherein the frame is a pause ethernet packet.

6. The optical transceiver of claim 1, wherein the transceiver has a centrally buffered output queue to store data.

7. The optical transceiver of claim 1, wherein the input and output bandwidth of the transceiver is enabled to be asymmetrical.

8. The optical transceiver of claim 1, wherein the transceiver supports lossless transmission and loss-based transmission.

9. The optical transceiver of claim 1, wherein the transceiver is packet aware.

10. The optical transceiver of claim 1, wherein the transceiver operates in cut-through mode (low latency).

11. The optical transceiver of claim 1, wherein the parsing and classification is according to an n-tuple classification.

12. The optical transceiver of claim 1, wherein the transceiver is enabled to prioritize packets according to an n-tuple classification.

13. The optical transceiver of claim 1, wherein the transceiver can police ethernet packets; wherein policing of the packets comprises dropping ethernet packets, blocking ethernet packets, and redirecting ethernet packets.

14. The optical transceiver of claim 1, wherein the transceiver is enabled to mirror ethernet packets to a host interface port for further inspection based on transceiver bandwidth.

15. The optical transceiver of claim 1, wherein the transceiver supports port-based priority flow control with a host; wherein port-based priority flow enables the transceiver to assign different priorities to each respective port enabling different data flow control for each port.

16. The optical transceiver of claim 1, wherein the transceiver supports multiple output priority queues.

17. The optical transceiver of claim 1, wherein the transceiver supports output queuing.

18. The optical transceiver of claim 1, wherein the transceiver supports remote network monitoring (RMON).

19. A method performed by a packet aware (L2/L3) coherent optical transceiver, the method comprising:
    receiving at an ethernet data input of the coherent optical transceiver MAC ethernet data input;
    mapping the ethernet data input into a packet buffer;
    parsing frames received by the coherent optical transceiver in the packet buffer;
    reading priority information in headers of the frames; and
    classifying the frames based on priority information contained in a header of the frame; and
    performing an action based on the classification.

20. The optical transceiver of claim 1 wherein the action is load balancing.

\* \* \* \* \*